April 28, 1953  J. C. WILSON  2,636,321
MACHINE TOOL

Filed Sept. 29, 1951  11 Sheets-Sheet 1

FIG-1

INVENTOR
JOHN C. WILSON
BY Toulmin & Toulmin
ATTORNEYS

April 28, 1953

J. C. WILSON 2,636,321

MACHINE TOOL

Filed Sept. 29, 1951

INVENTOR
JOHN C. WILSON
BY Toulmin & Toulmin
ATTORNEYS

April 28, 1953     J. C. WILSON     2,636,321
MACHINE TOOL Filed Sept. 29, 1951     11 Sheets-Sheet 7

INVENTOR
JOHN C. WILSON
BY *Toulmin & Toulmin*
ATTORNEYS

April 28, 1953 J. C. WILSON 2,636,321
MACHINE TOOL

Filed Sept. 29, 1951 11 Sheets-Sheet 8

INVENTOR
JOHN C. WILSON
BY *Toulmin & Toulmin*
ATTORNEYS

April 28, 1953 — J. C. WILSON — 2,636,321
MACHINE TOOL
Filed Sept. 29, 1951 — 11 Sheets-Sheet 9

INVENTOR
JOHN C. WILSON
BY Toulmin & Toulmin
ATTORNEYS

FIG-15

Patented Apr. 28, 1953

2,636,321

UNITED STATES PATENT OFFICE 2,636,321

MACHINE TOOL

John C. Wilson, Springfield, Ohio, assignor to The Thompson Grinder Company, Springfield, Ohio, a corporation of Ohio Application September 29, 1951, Serial No. 248,900

11 Claims. (Cl. 51—108)

This invention relates to machine tools, and particularly to grinding machines. More particularly still, this invention relates to a grinding machine having a rotary table on which is mounted a plurality of fixtures, such as chucks, for supporting workpieces to be machined.

The particular object of the present invention is the provision of a grinding machine which is extremely rapid in operation in that substantially all of the available working time of the machine is utilized in the machining of workpieces, and substantially no time is lost in the loading of workpieces into the machine, and the unloading of workpieces therefrom.

Another particular object of this invention is the provision of a grinding machine arrangement wherein work cycles requiring a copious supply of coolant can be carried out, but without said coolant splashing about outside the working station of the machine.

Another object of this invention is the provision of a grinding machine having controls whereby the grinding wheel of the machine can accurately be positioned either in grinding position or in dressing position and at the will of the operator.

Another object of this invention is the provision of a hydraulic control circuit for a grinding machine of the nature referred to which is simple in arrangement, but efficient in operation.

Still another object of this invention is the provision of an improved dressing arrangement for use with a grinding machine of the nature referred to.

One of the particular objects of the present invention is the provision, for use with a grinding machine or similar machine tool, of an improved turret arrangement for indexing a plurality of work stations into working or loading positions in the machine.

Still another particular object of this invention is the provision of an improved arrangement for selectively driving or braking the stations mounted on the movable turret of the machine as these said stations move into and out of working position in the machine.

These and other objects and advantages will become more apparent upon reference to the following description taken in connection with the accompanying drawings, in which.

Referring to the drawings somewhat more in detail, and particularly to Figures 1 through 4, the machine of this invention generally comprises a main bed portion 10 within which is rotatably mounted a turret 12.

Either attached to the bed or separately supported adjacent thereto is a column structure 14 having the machined ways 16 on which is slidably mounted a saddle element 18. Saddle element 18 is reciprocable vertically on ways 16 by means of a lead screw 20 arranged vertically within the column and adapted for being driven in rotation either by a motor arrangement or manually in a manner to be described hereinafter.

Figure 3:
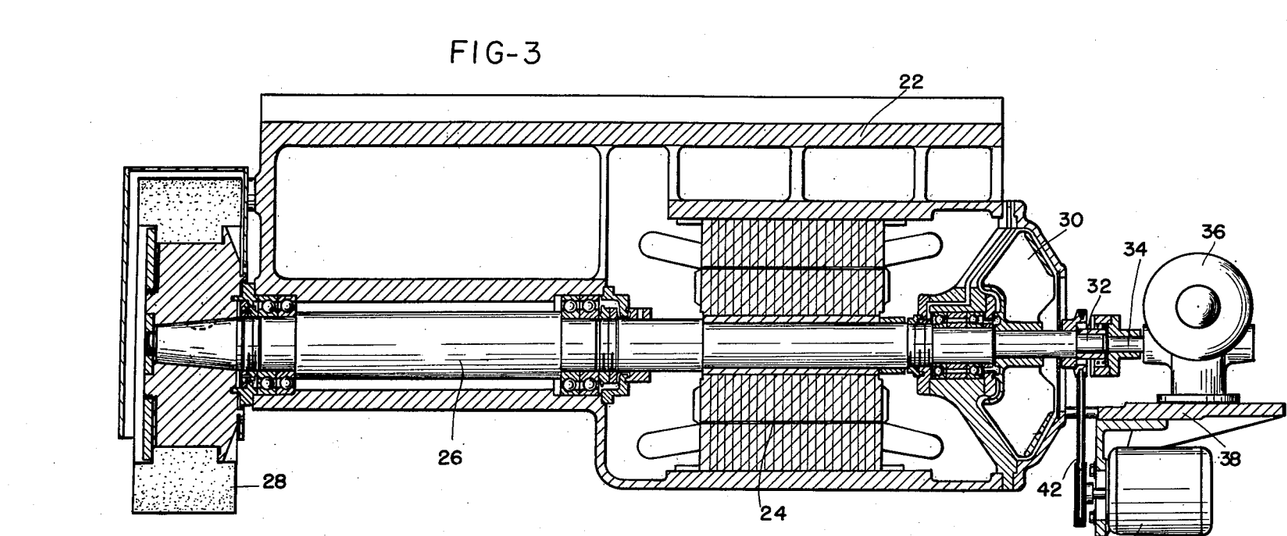
Figure 3 is a longitudinal section taken along the wheel head spindle of the machine and is illustrated by the line 3—3 on Figure 2.

Slidably supported in saddle 18 for movement in a horizontal direction, is the wheel head structure 22 and which is illustrated in section in Figure 3. Wheel head structure 22 comprises a drive motor 24 having an elongated shaft 26 forming a spindle which supports grinding wheel 28. At the end opposite grinding wheel 28 spindle 26 supports a coolant fan 30 by means of which air is driven through the motor housing, and rightwardly of fan 30 spindle 26 is connected through an overrunning clutch 32 with another shaft 34 forming the low speed output shaft or motor 36.

Motor 36 is for the purpose of driving the spindle at low speed when the grinding wheel is to be dressed, and this motor may advantageously be mounted on a platform 38 carried at the right end of the wheel head structure.

Also mounted on platform 38 is a switch 40 which is belted to spindle 26 by the belt arrangement 42. This switch is a plugging switch and is utilized for the purpose of bringing the wheel head motor to a sudden halt whenever it is desired to dress the said wheel, and at which time it is to be operated at low speed.

Returning to the operation of lead screw 20, this is connected, as by bevel gears 44, with a shaft 46 leading through the bed to a hand wheel 48 at the operator's position at the front of the machine. Operation of this hand wheel manually will rotate lead screw 20 to raise or lower saddle 18. Shaft 46 is also arranged to be driven by a motor 50 mounted within the bed, which is connected with the shaft via the mechanism generally indicated at 52.

Motor 50 can be reversibly energized to drive shaft 46 either in one direction or the other, thereby either to raise or lower saddle 18. In this manner the grinding wheel can be fed toward and away from the work either by power or manually.

Figure 12:
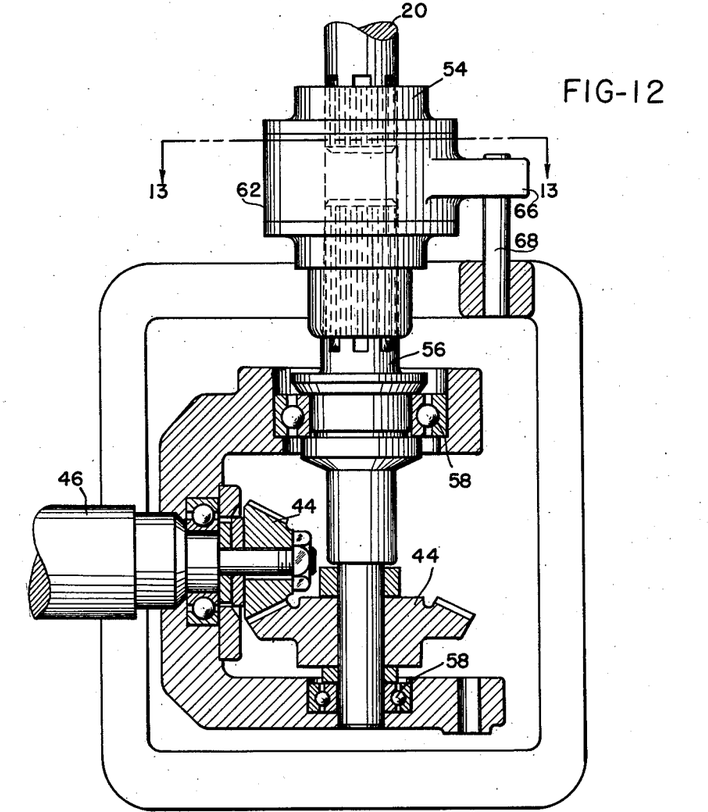
Figure 12 is an enlarged sectional view of a brake arrangement positioned at the lower end of the lead screw which raises and lowers the wheel head and the location in which the view is taken is indicated by the arrow 12 in Figure 1.
Figure 13:
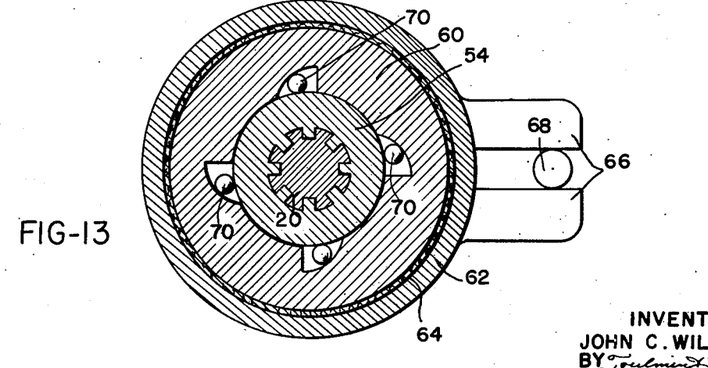
Figure 13 is a plan sectional view indicated by line 13—13 on Figure 12 showing the arrangement of an overrunning clutch and friction material within the device of Figure 12.

At its lower end lead screw 20 has a friction clutch arrangement, best illustrated in Figures 12 and 13. This friction clutch arrangement is for the purpose of preventing the saddle and wheel head assembly from coasting downwardly. This situation can come about because the assembly of the saddle and wheel head is quite heavy, and when an anti-friction nut is employed to connect screw 20 with the saddle, the weight of the said assembly will drive the screw and cause the assembly to move downwardly.

In order to prevent this, the screw 20 is splined to a block 54 which forms a connector between lead screw 20 and a short shaft 56 journaled, as at 58, and on which is mounted one of the bevel gears 44. Block or connector 54 is positioned within a larger block 60 that has frictional engagement with a housing 62, as by means of the friction material 64. Housing member 62 has a pair of projecting fingers 66 that embrace a pin 68 fixed in the machine, so the said housing member is held against rotation, but is free to reciprocate.

Between blocks 54 and 60 there are arranged the balls 70 which will cause the blocks drivingly to engage when the inner block 54 is turned in a counterclockwise direction, as viewed in Figure 13, but will disconnect the blocks when the said inner block is rotated in a clockwise direction, as viewed in Figure 13. By the described arrangement, the lead screw 20 can be driven in a direction to elevate the saddle without any resistance from the described brake arrangement, but rotation of the screw in the other direction is opposed by the action of the brake mechanism.

Figure 4:
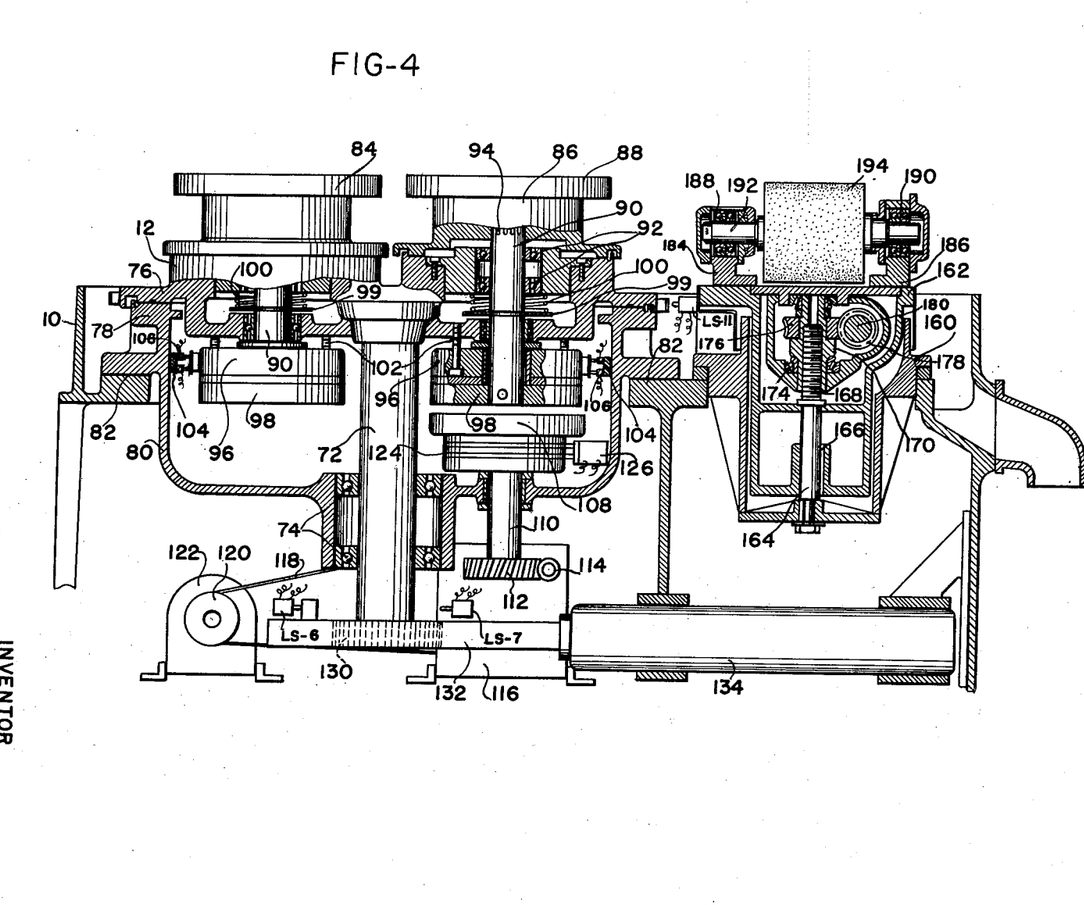
Figure 4 is a transverse section through a portion of the machine showing the construction of the rotary turret, the arrangement of the wheel dresser of the machine, and is indicated by line 4—4 on Figure 2.

The turret 12, previously referred to, is illustrated in some detail in Figure 4. In Figure 4 it will be observed that the turret has connected therewith a main central shaft 72 that is journaled, as by bearings 74, in the bed of the machine. About its periphery turret 12 comprises the machined flange 76 which bears on a corresponding machined annular surface 78 of the bed. This provision of these two flanges provides rigid support for the turret at all times, so that even when taking heavy cuts on workpieces mounted on the stations of the turret there will be no deflection of the said turret.

The shaft 72 therefore does not have as its major function the support of the turret, but rather guides the turret and drives it in rotation while the flange 76 and the machined surface 78 provide support for the turret.

Advantageously, the part of bed 10 comprising the machined surface 78 may consist of a bowl-shaped member 80 adapted for insertion into the bed to be secured thereto as by the mating flanges identified at 82. By this arrangement, the fine machining necessary to provide bores receiving the anti-friction bearings 74 and the machining of the surface 78 can be carried out on a smaller piece than the large bed casting.

Mounted in the turret are two work stations identified by the numerals 84 and 86, and each comprising a rotatable work supporting part 88 having a drive shaft 90 connected thereto and extending downwardly through bearings 92 into the space beneath the turret. The shafts 90 are preferably splined, as at 94, to their respective rotary members 88, thus leaving the shafts 90 reciprocable in the direction of their axis, while remaining drivingly engaged with the said members.

Supported on the underneath side of the turret in alignment with each of the work stations 84, 86, is the stationary part 96 of a magnetic brake arrangement, the movable armature portion of which, 98, is secured to the lower end of the associated shaft 90.

Each of the shafts 90 includes a plate 99 between which and a fixed point on the turret thereabove there bears a spring 100. The arrangement is such that normally the springs urge the shafts 90 and the armatures 98 downwardly, but upon energization of the brakes 96, the said shafts and armatures will be urged upwardly into the position in which they are illustrated in Figure 4.

The bolts 102 provide for fixedly supporting the brake elements 96 on the turret so that when the said brake elements are engaged with the armatures 98, the armatures, and, therefore, the associated shafts 90 are held against rotation.

Mounted about the inner periphery of member 80 are slip rings 104, and each of the stationary brake elements 96 includes brushes 106 engaging the said slip rings. By controlling the energization of the slip rings, the energization of the said stationary brake elements can therefore also be controlled.

In alignment with the one of shafts 90 in the working position, there is the rotatable magnetic drive member 108, having a drive shaft 110 that mounts a worm wheel 112, engaged by a worm 114 mounted on the output shaft of a transmission 116 that is arranged to be driven by a belt 118 leading to the pulley 120 on the output shaft of a motor 122. The magnetic drive member includes slip rings 124 that are engaged by brushes 126 carried by member 80. By controlling the energization of brushes 126, the energization of the magnetic drive member 108 can be controlled. By de-energizing the brake associated with the one of armatures 98 adjacent magnetic drive member 108 and energizing the said drive member, the said armature 98 is pulled downwardly into engagement with the drive member and this drivingly connects shaft 110 with shaft 90 so that the work supporting member 88 can be rotated. The described arrangement is such that only one rotatable magnetic drive member is required, and this can be mounted in a stationary position within member 80 so that it always aligns with the turret station that is in working position. This results in a more inexpensive arrangement than if it were necessary to provide two of the magnetic drive members, and likewise simplifies the problem of driving the work supporting member in the working position of the turret and simplifies the construction of the machine and makes it considerably lighter.

The turret 12 is adapted for being indexed between its two operative positions by means of a gear 130 mounted on the lower end of shaft 72, and which is engaged by a rack 132 mounted on the ram of the hydraulic motor 134. As will be best seen in Figures 6 and 7, spaced adjustable abutments 136 are provided adapted for engagement with a stop lug 138 carried on turret 12. In this manner, the two operative positions of the turret are positively determined merely by reversibly energizing hydraulic motor 134.

Figure 1:
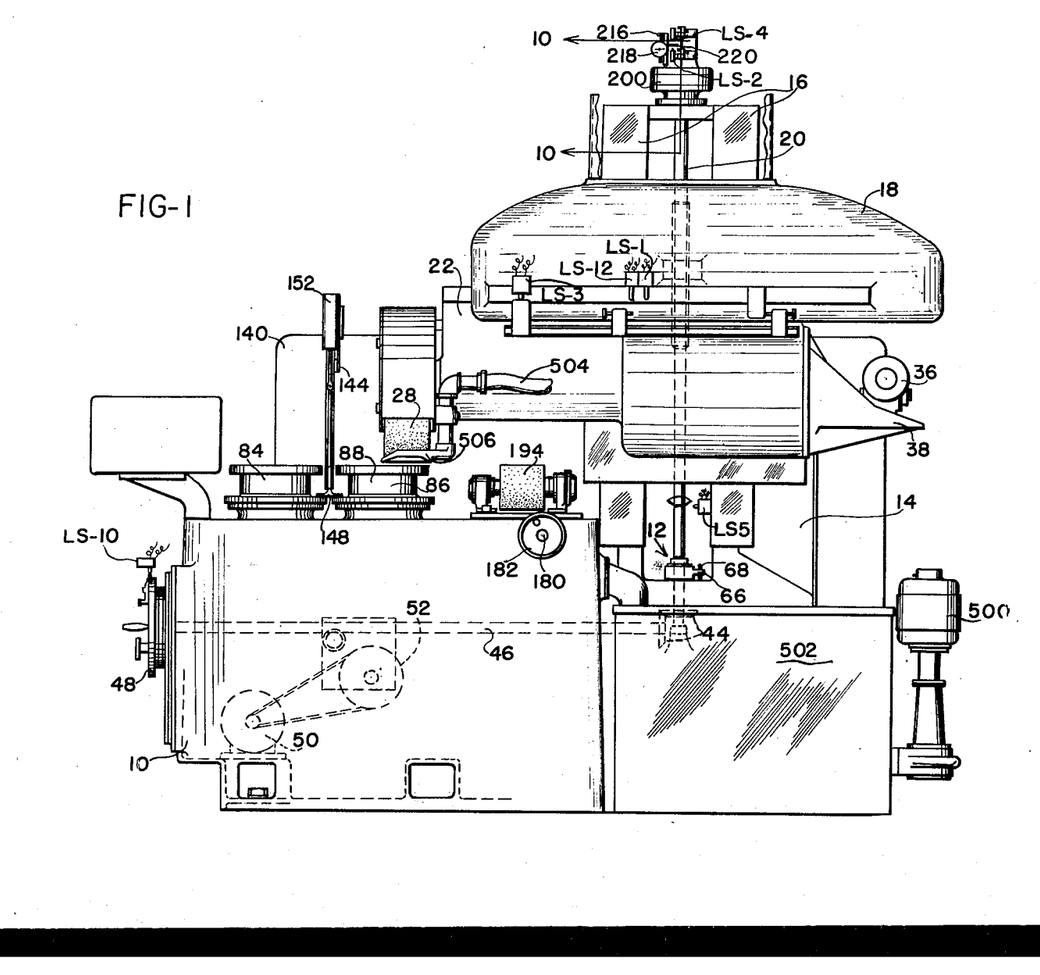
Figure 1 is a side elevational view of a grinding machine constructed in accordance with this invention.
Figure 2:
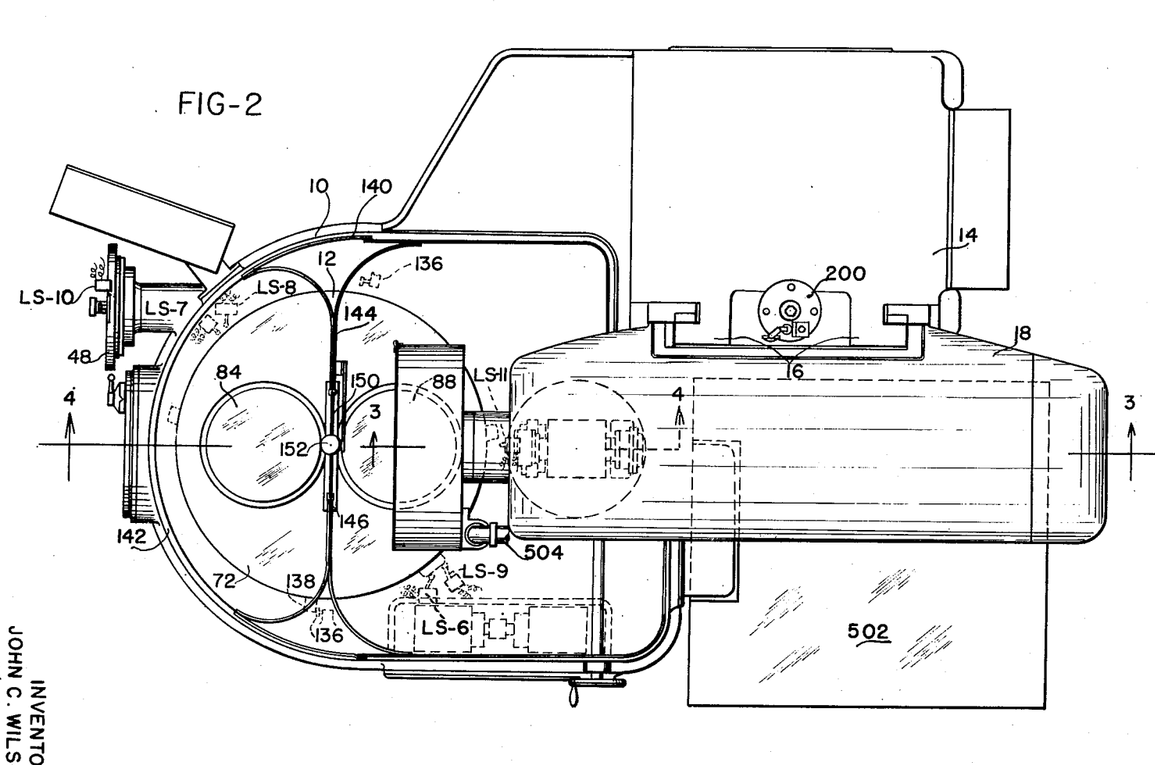
Figure 2 is a plan view looking down on top of the machine illustrated in Figure 1.
Figure 6:
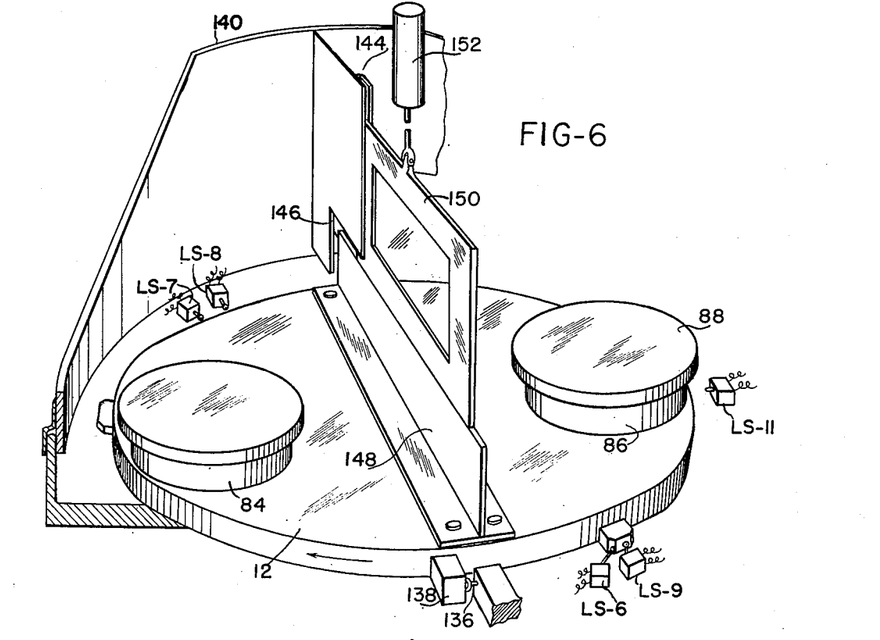
Figure 6 is a perspective view illustrating the arrangement of the movable splash shield utilized with the turret in the machine of this invention.
Figure 7:
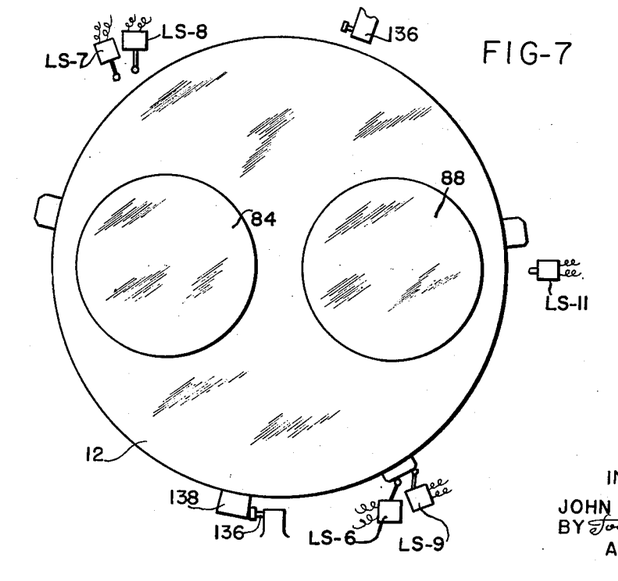
Figure 7 is a plan view looking down on top of the turret of the machine illustrating somewhat more in detail the relative positions of the stops which limit the movement of the turret and the limit switches and actuating cams therefor associated with the turret.
Figure 8:
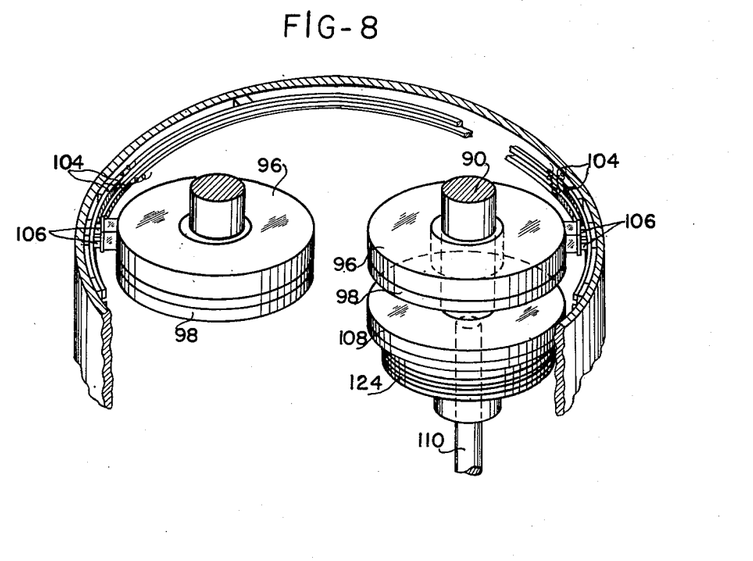
Figure 8 is a fragmentary perspective view diagrammatically illustrating the arrangement for energizing the clutches and brakes associated with the workpiece holding element forming a part of the turret.
Figure 9:
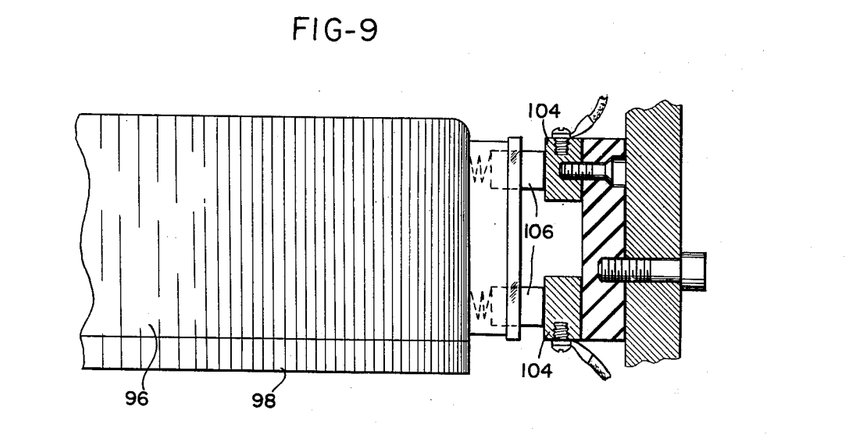
Figure 9 is an enlarged detailed view showing how the slip rings by means of which the brakes illustrated in Figure 8 are energized.

In Figures 1, 2, and 6 there is illustrated a novel splash shield arrangement forming a part of this invention. In these figures it will be seen that the splash shield comprises an outer part 140 extending peripherally around the bed 10 and being cut out at the operator's position, as at 142, to permit access to the chucks on the turret for changing workpieces thereon.

The splash shield comprises a partition 144 extending across the center of the turret and this partition 144 is notched out at its bottom at 146. This notch 146 is closed by a transversely extending panel or like member 148 mounted on the turret for rotation therewith. The cut-out notch in the partition 144 permits the indexing of the turret beneath the partition with the workpieces on the chuck thereof, and the panel 148 closes the space beneath the said cut-out.

The intermediate portion of the cut-out is provided with a slidable window 150 to which is connected a fluid motor 152 by means of which it is raised and lowered. The purpose of the window is so that the notch 146 can be made sufficiently high that workpieces of various heights can be indexed under the partition of the splash shield, but permits the panel 148 to be made short enough that it will index beneath the grinding wheel of the machine without raising the said wheel.

Inasmuch as the table oscillates during its indexing movement, each end of the upstanding panel 148 overlaps the adjacent portion of the partition 144 and there is a sealing strip interposed between the two. In this manner the splash shield is made substantially splash-proof, but at the same time the turret can readily index relative to the stationary part of the shield when the window portion 150 is lifted.

Figure 5:
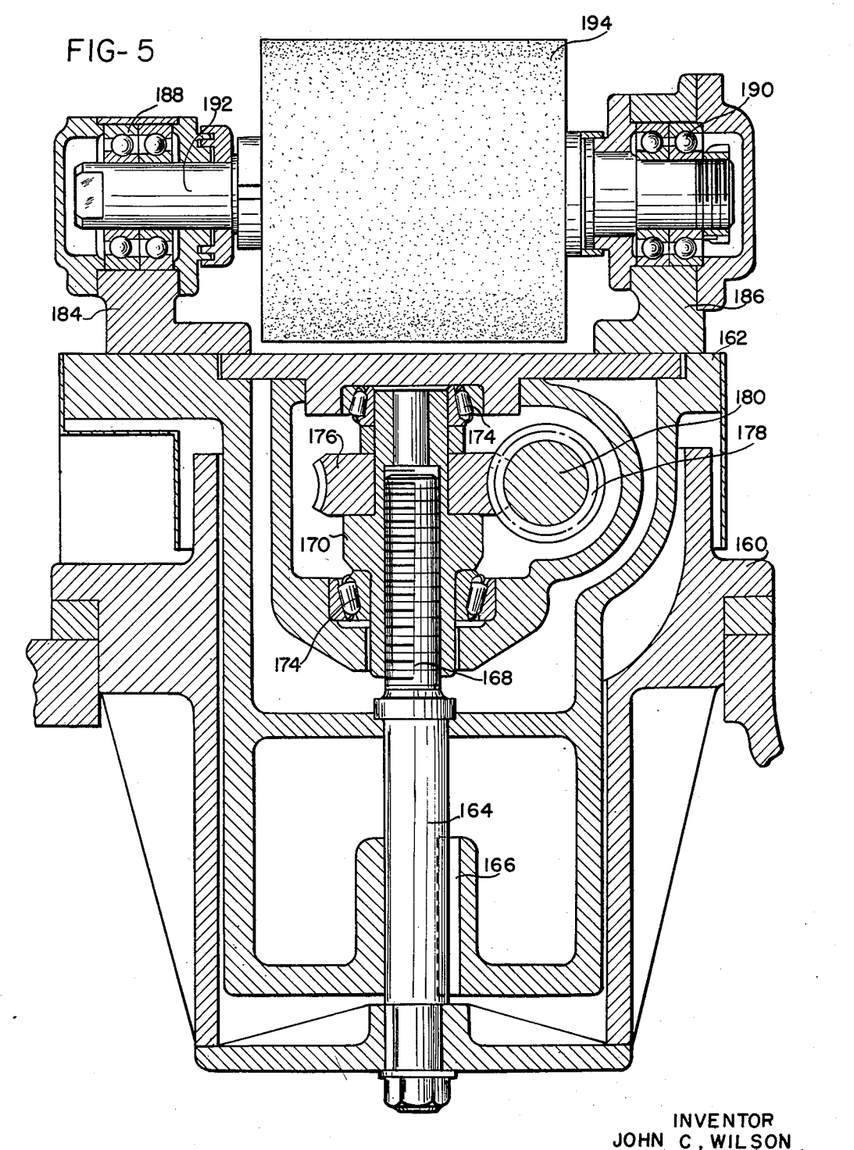
Figure 5 is an enlarged vertical section taken through the dresser arrangement as it appears in Figure 4.

Figures 4 and 5 illustrate the arrangement in the bed of the machine and the construction of a dressing device for trueing the grinding wheel. In the bed to one side of the turret there is mounted a frame 160 within which is slidable a sub-frame 162. A threaded rod 164 is secured in the bottom wall of frame 160 and extends upwardly therefrom. This rod is keyed at 166 to sub-frame 162. At its upper end the rod 164 has the threads 168 engaged by a nut 170 journaled in sub-frame 162 by bearings 174. Mounted on nut 170 is a worm wheel 176 engaged by a worm gear 178 mounted on a shaft 180 that carries a hand wheel 182 externally of the bed. It will be apparent that rotation of the hand wheel 182 will cause nut 170 to turn on rod 164, and thus to raise or lower sub-frame 162 within frame 160.

On the top of sub-frame 162 there is mounted the spaced bearing brackets 184 and 186 having therein anti-friction bearings 188 and 190, respectively, which support a shaft 192 on which is mounted a dressing roll 194. The dressing roll is made according to conventional practices of a suitably hard material and is adapted for forming or trueing the periphery of a grinding wheel by being brought together therewith under pressure and rotated therewith so as to crush the bonding of the wheel by a pressure engagement therewith.

Figures 10, 11:
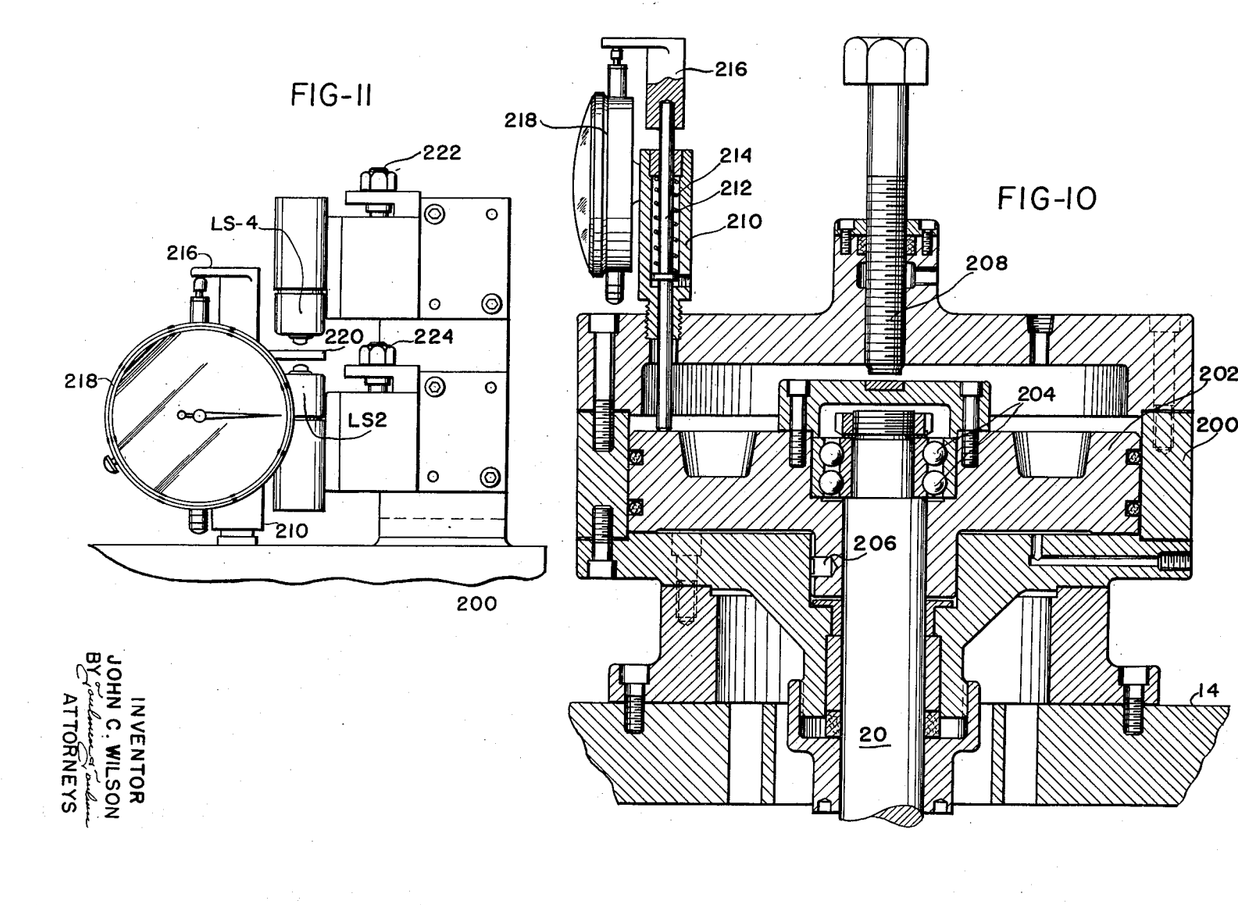
Figure 10 is a sectional view indicated by line 10—10 on Figure 1, and showing the construction of a hydraulic arrangement employed for reciprocating the lead screw by means of which the wheel head of the machine is raised and lowered relative to the turret.
Figure 11 is a fragmentary view looking in from the left side of Figure 10 showing the manner in which the indicator illustrated therein is supported and actuated, and also showing the arrangement of a pair of limit switches and the actuators therefor.

Turning now to Figures 10 and 11, there is illustrated the construction of the machine at the upper end of the lead screw 20. The upper end of lead screw 20 extends into a cylinder 200 mounted on top of the column 14. Reciprocably mounted in cylinder 200 is a piston 202 that rotatably supports the upper end of lead screw 20, as by the anti-friction bearings 204. Piston 202 is preferably keyed in cylinder 200 so as to be prevented from rotating therein by a slidable key 206. The movement of piston 202 is limited in cylinder 200 by being arranged to abut the bottom thereof when moving downwardly and is stopped in its upward movement by the adjustable stop screw 208 carried in the closure plate on top of the cylinder. For indicating the amount of movement of piston 202 in cylinder 200 there is secured to the head of the cylinder a sleeve element 210 reciprocably receiving the plunger 212 continuously urged downwardly by a spring 214 and having its lower end bearing on the upper surface of piston 202.

Mounted on the upper end of plunger 212 is a block 216 that engages the actuating plunger of an indicator 218, the arrangement providing a ready means for determining the exact position of piston 202 in cylinder 200.

Block 216 may also advantageously include a blade 220 positioned between a pair of limit switches LS-4 and LS-2 that are adjustably carried on the upper side of cylinder 200, as, for example, on the said head thereof. The limit switches can be independently adjusted by adjustment of their support screws 222 and 224 and their position is such that they are readily accessible at all times for such adjustment as is necessary.

Figure 14:
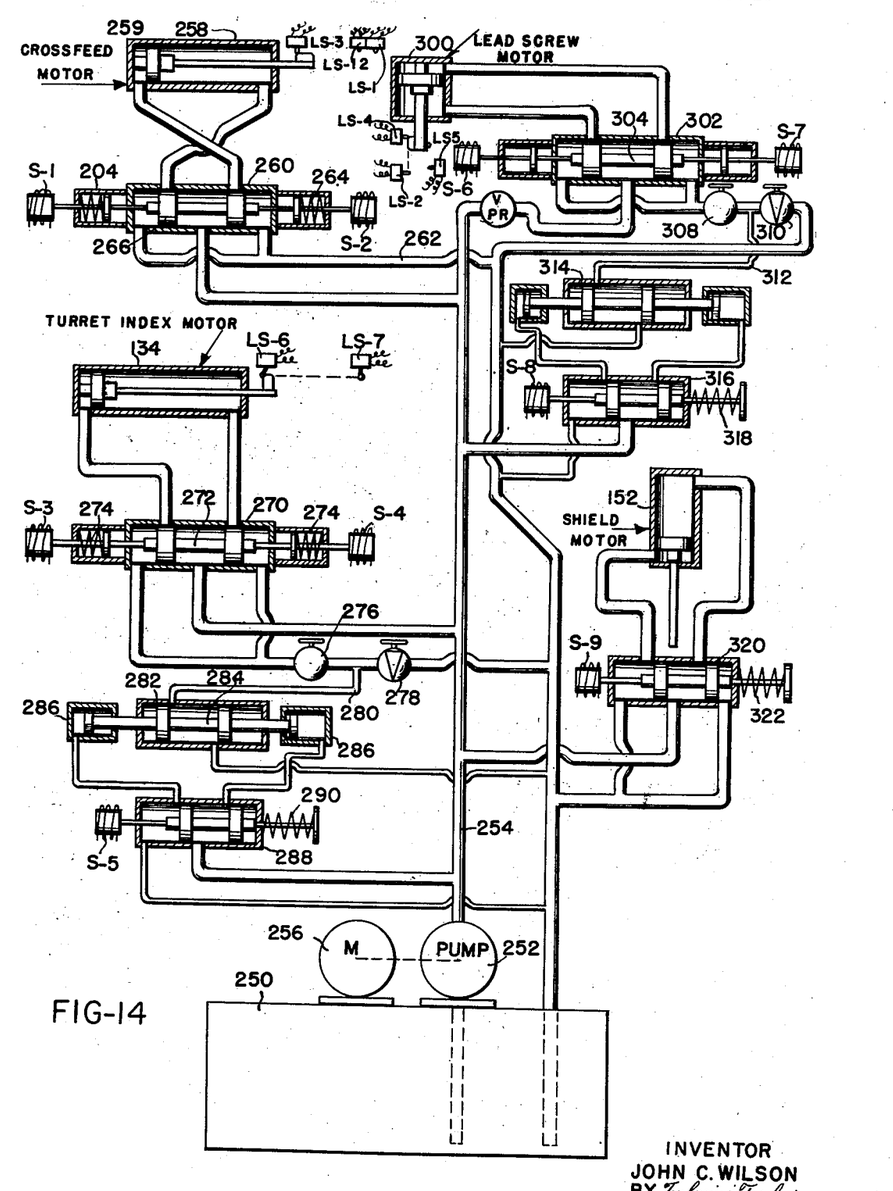
Figure 14 is a diagrammatic view illustrating the preferred form of hydraulic control circuit for use with the machine of this invention.

In Figure 14 there is illustrated more or less diagrammatically the hydraulic actuating circuit for the machine of this invention. In this view there is a reservoir 250 to which is connected a pump 252 to draw fluid therefrom to discharge the said fluid at increased pressure into a pressure manifold 254 leading to the several control valves of the circuit. Pump 252 is arranged to be driven by a motor 256, as illustrated. Associated with the wheel head and connected between the saddle and the wheel head proper is a cylinder 258 having a control valve 260 to which is connected the said pressure manifold 254 and which also has connections with an exhaust manifold 262.

Springs 264 normally hold the valve member 266 of valve 260 in its centered position preventing the supply and exhaust of fluid from cylinder 258, but energization of either of the actuating solenoids S1 or S2 is operable for shifting the valve member to bring about actuation of the piston 259 in the cylinder.

The index motor 134 also has associated therewith a control valve 270 whose valve member 272 is normally centered in a flow-blocking position by the springs 274. The valve member 272 is adapted for being shifted into either of its operative end positions by energization of one or the other of the solenoids S3 or S4.

The exhaust of valve 270 is directed through a throttle valve 276 and an adjustable needle valve 278 in series therewith to the previously mentioned exhaust manifold 262. However, a by-pass is arranged around the adjustable needle valve 278. This by-pass comprises a conduit 280 containing a valve 282 whose valve member 284 is movable from a first position where the said conduit is established to a second position where the said conduit is interrupted.

Fluid operable pilot means 286 on the opposite ends of valve 282 provide means for shifting the valve member 284 between its two operative positions. These pilot means are connected with the service ports of a control valve 288 normally urged into position by a spring 290 to so shift valve member 284 that the by-pass conduit 280 is effective for by-passing the fluid flow around needle valve 278.

However, energization of a solenoid S5 is operable for shifting the valve 288 into its other position, and in this position this by-pass is interrupted. The purpose of this arrangement is so that during normal movement of the ram of motor 134 it can move at relatively rapid speed with the discharge of valve 270 passing through choke valve 276 and the by-pass conduit 280. However, as motor 134 approaches its final position, solenoid S5 is energized, bringing about the interruption of the said by-pass, and then the discharge of motor 134 must flow through the needle valve 278.

Needle valve 278 is arranged to have considerably more restriction than choke valve 276, and this causes a material slow-down of motor 134, providing a cushioning of the element driven thereby.

Associated with the lead screw 20 is a fluid motor 300 which can be energized for the purpose of raising the wheel head and saddle rapidly from its working position. This motor is connected with a control valve 302 having a valve member 304. Energization of one or the other of the solenoids S6 and S7 is operable to shift the valve member to one or the other of its operative end positions.

Similarly to the by-pass arrangement associated with valve 270, valve 302 has a by-pass arrangement including a choke valve 306 through which the discharge from valve 302 always passes and the needle valve 310 which is by-passed by a conduit 312, in which conduit is the valve 314 adapted for either establishing the conduit or interrupting the conduit in the same manner as described in connection with the by-pass associated with the valve 270.

Valve 314 includes pilot operators which are connected with a control valve 316 normally urged by a spring 318 into position to hold valve 314 in its by-pass establishing position. The solenoid S8 is provided, which can be energized to shift the valve 316 into position to move valve 314 into its by-pass interrupting position.

Motor 152, associated with the movable window of the splash-shield, has a control valve 320 normally urged by a spring 322 into position to hold the window in its lowered position. Energization of a solenoid S9 is operable to shift the control valve to energize motor 152 to raise the shield into the position it will occupy when the turret indexes.

*Electric control circuit*

Figure 15:
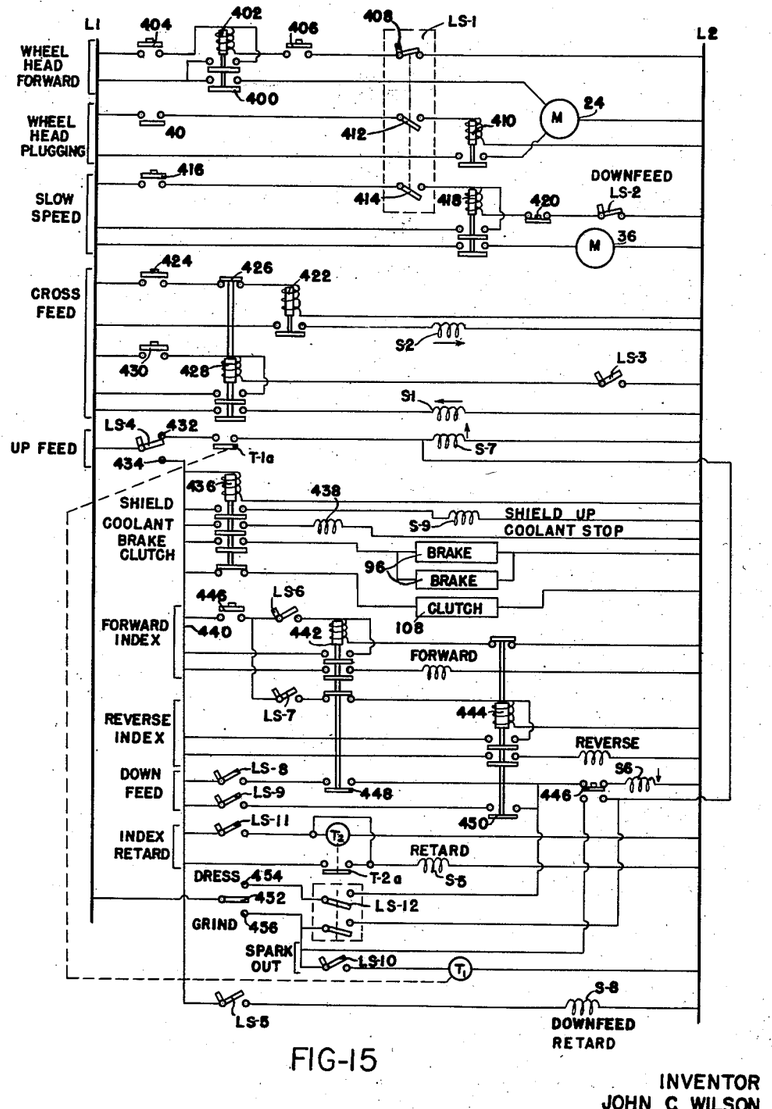
Figure 15 is a diagrammatic layout of the electric control circuit by means of which the operation of the hydraulic circuit and the operation of the various other auxiliaries of the machine are all integrated and controlled.

Figure 15 illustrates one of the preferred forms which the electric control circuit may take. In Figure 15, the main supply lines are indicated at L1 and L2 and therebetween are arranged the several relays, operating solenoids, motors, timers, the brakes, and the drive clutch of the machine. The wheel head motor 24 is connected to be energized in its forward direction by a blade 400 of a contactor 402 adapted for being energized by push button 404 and for being de-energized by stop switch 406 or by the opening of a blade 408 of a limit switch LS-1 mounted on the saddle for engagement by a cam carried on the wheel head when the wheel head is moved backwardly from its grinding position toward dressing position.

Motor 24 is adapted for being energized in the reverse direction of rotation by a contactor 410 in series with a blade 412 of switch LS-1 which closes when the wheel head moves to dressing position. The plugging switch 40 is in series with contactor 410 and is closed during forward rotation of motor 24, but opens when the motor comes to a halt. Thus, whenever the wheel head is moved backwardly toward dressing position and switch LS-1 is actuated, motor 24 is first de-energized and then immediately energized to run in reverse rotation which brings it quickly to a halt, and at which time plugging switch 40 will open and leave the said motor de-energized and stationary.

Switch LS-1 also has a blade 414 in series with a normally open push button 416 and the solenoid of a contactor 418 adapted for energizing slow-speed motor 36, which will drive the wheel head spindle at dressing speed. Stop switch 420 is provided for stopping motor 36 and a limit switch LS-2 may be provided which will open when the proper amount of feeding together of the grinding wheel and dressing roll has been accomplished in order to stop the dressing cycle.

Solenoid S2 which is energized to move the wheel head from grinding position to dressing position is adapted for being energized by energization of a relay 422 that is in series with a normally open push button 424 and the normally closed blade 426 of a relay 428.

Solenoid S1 which shifts valve 260 to move the wheel head back to grinding position from its dressing position is adapted for being energized by energization of relay 428, which is in series with a normally open push button 430 and a limit switch LS-3 which opens when the wheel head reaches its grinding position.

The limit switch LS-4, previously referred to in connection with the description of the hydraulic means for reciprocating the lead screw, is normally closed on a contact 432 whenever the lead screw is moved downwardly from its uppermost position, is closed on a contact 434 whenever the said lead screw is in its uppermost position.

When the switch LS-4 is closed on contact 434 a relay 436 is energized and energization of this relay will energize solenoid S9, which will cause the shield to move upwardly, will energize a solenoid 438, which will either halt or divert the supply of coolant from the working space, will energize the brake elements 96, which will halt the rotatable members on the turret, and will de-energize the rotatable drive member 108.

Closure of limit switch 104 on its contact 434 also connects wire 440 with power line L1 and thus supplies energy for energizing the forward index relay 442 or the reverse index relay 444. These last mentioned relays are arranged in parallel and are adapted for being energized by a single push button 446. Push button 446 is connected to a normally open limit switch LS-6, with the solenoid of the forward index relay 442, which is also in series with a normally closed blade of the reverse index relay 444, where switch LS-6 is adapted for being closed by a cam on the turret, when the turret has completed an indexing movement in the reverse direction.

The switch 446 is similarly connected with a limit switch LS-7 and a normally closed blade on the forward index relay 442 with the solenoid of the index relay 444. Switch LS-7 is adapted for being closed by a cam on the turret at the end of a forward indexing movement. The provision of switches LS-6 and LS-7 provides for selective energization of the indexing relays while the interlocks between the relays prevent more than one thereof from ever being energized at one time.

A limit switch LS-11 is provided adapted for being closed by a cam on the turret as the turret approaches the limit of its indexing movement in either direction and which is effective in energizing a timer T2, having a blade T2a which, when closed, will energize solenoid S5 that will bring about a retardation of the rate of movement of the turret, thereby providing for a cushioned stop thereof. At a pre-determined time as the timer T2 is energized, its blade will open and again de-energize solenoid S5.

Arranged between wire 440 and line L2 is the solenoid S6 which, when energized, will shift the valve associated with the down-feed motor mounted at the upper end of the lead screw so as to drive the lead screw downwardly. This solenoid is in series with a normally closed push button 446, which is connected with wire 440 through a normally open blade 448 of the forward index relay 442 and a normally open limit switch LS-8, which is adapted for being closed by a cam on the turret at the end of a forward indexing movement. Switch 446 is also connected with wire 440 through a normally open blade 450 of the reverse index relay 444 and a normally open limit switch LS-9, which is adapted for being closed by a cam on the turret at the end of a reverse indexing movement.

It will be apparent that whenever an indexing movement of the turret takes place, when the said indexing movement has been completed, the one of limit switches LS-8, LS-9 associated with the closed one of blades 448, 450, will close and energize solenoid S6 to bring about a downward movement of the lead screw to commence a working cycle.

As soon as the lead screw starts downwardly, switch LS-4 will leave contact 434 and close on contact 432, thereby de-energizing the solenoid of relay 436, and in turn de-energizing solenoid S9, which will cause the shield to move downwardly, de-energizing solenoid 438, which will resume the coolant supply to the working station, de-energize brakes 96, which will release the rotatable member in the working station, and energize drive member 108 to drive the rotatable member in the working station for carrying out the working cycle.

As the lead screw approaches its lowermost position, it will engage and close limit switch LS-5, which will bring about energization of solenoid S8, which, in the manner previously described, will throttle the discharge from the motor driving the lead screw and thereby retard the downward movement of the lead screw over the last part of its travel.

According to this invention the grinding of the work piece in the working station may be carried out during this described movement of the lead screw or this movement of the lead screw, may be used merely to advance the grinding wheel to working position, whereupon other and well-known means, either manual or automatic, and either continuous or intermittent, can be employed for obtaining whatever additional advancing movement of the wheel is required completely to finish the grinding operation being carried out.

Whenever the wheel head is fed downwardly the required distance, indicating that the proper depth of cut has been obtained, a limit switch LS-10 is closed which energizes a timer T1. The timer T1 has a blade T1a adapted for closing a pre-determined time after the timer T1 is energized and which is effective when closed for energizing solenoid S7, which brings about the up-feed of the wheel head by actuating the hydraulic motor connected to the upper end of the lead screw.

In addition to the limit switch LS-1 previously referred to as being mounted on the saddle for actuation by a cam on wheel head when the wheel is moved into dressing position, there is a second limit switch LS-12 also mounted on the saddle for actuation by the cam, which effects certain changes in the electric circuit in the following manner. A manually operated selector switch 452 is provided, having one position where it is closed on a contact 454 to select the dressing cycle, and having a second position where it is closed on a contact 456 for a grinding cycle. When switch 452 is closed on contact 456 and the wheel head is moved to dressing position, limit switch LS-12 is closed by the cam on the wheel head, and this causes energization of the up-feed solenoid S7, thereby raising the wheel to its upper limit of travel. Thereafter, when switch 452 is adjusted to dressing position, a circuit is completed through limit switch LS-12 to solenoid S3, which causes down-feed of the wheel to bring it to dressing position. Further movement of the wheel and dressing roll together may be accomplished either automatically or manually.

Figure 16:
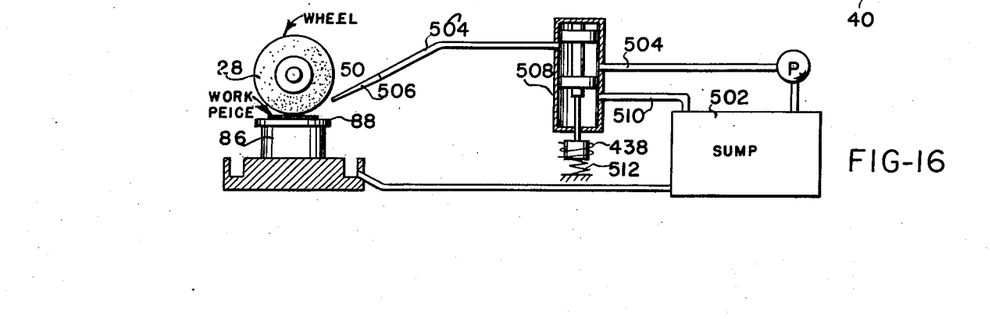
Figure 16 is a diagrammatic view showing the manner of controlling the supply of coolant to the working station of the machine.

Figure 16 shows one way of directing the coolant supply from the wheel 28. A pump P draws coolant from sump 502 and discharges through conduit 504 and nozzle 506 to the wheel. When valve 508 is shifted by energization of solenoid 438, the coolant pumped returns to sump 502 via conduit 510. De-energization of solenoid 438 permits spring 512 to return the valve to its initial position.

*Operation*

In order better to disclose the nature of a machine of this invention, a brief and undetailed description of a typical operating cycle will now be given.

Let it be assumed that there is a work piece on the chuck in the working station that has been operated by the grinding wheel and another work piece on the chuck in the loading station that is ready to be operated. The wheel head, saddle, and lead screw are located at the uppermost position, the splash shield is in its upper position, the coolant supply has been halted or diverted, the brakes 96 are energized, thereby holding both chucks stationary, and the rotatable drive member 108 is de-energized. The wheel is rotating at grinding speed and is positioned in its working position.

By depressing push button 446, the turret will be caused to index from whichever position occupies to its other position, with the halting of the turret at the end of the indexing movement being cushioned in the manner previously described.

At the end of the indexing movement of the turret, an automatic down-feed of the wheel head, saddle, and lead screw will take place with the simultaneous lowering of the splash shield, resumption of the coolant supply, de-energization of the brakes and energization of the rotatable drive member 108. The down-feeding of the wheel head is cushioned in the manner already described, and because of this, ample time is had for the chuck in working position to come up to speed before being engaged by the grinding wheel.

After the wheel head has reached the limit of its down-feed, whether this be accomplished solely by reciprocation of the lead screw or whether this movement be partly accomplished by rotation of the lead screw, the down-fed limit screw LS-10 will be closed to initiate a time delay or "spark out" at the end of which the wheel head, saddle, and lead screw will move upwardly to the uppermost position, and at which time all conditions that prevailed at the beginning of the cycle are restored with the exception of the turret being in its opposite indexed position.

When it is desired to dress the wheel, the push button 424 is closed, which causes traversing of the wheel head from grinding position to dressing position. During movement of the wheel head to grinding position, the wheel head motor 24 is de-energized and brought to a quick halt while simultaneously a circuit is established by means of which the slow speed spindle driving motor 36 can be energized. Limit switch LS-12 is also actuated by this movement of the wheel head to condition the circuit for a dressing cycle, and thereafter manual selector switch 452 can be adjusted to "dress" position, the wheel and roll brought together, motor 36 energized by closing push button 416, and the wheel and roll then fed together in any suitable manner to obtain the desired dressing action. After the dressing of the wheel is completed, motor 36 is de-energized either by opening push button 420 manually, or by limit switch LS-2 being opened upon movement of the wheel and roll toward each other. The wheel head is then fed upwardly, and then is traversed back to grinding position by closing push button 430. The wheel head will stop in grinding position by opening limit switch LS-3 and will be held in that position until again traversed to dressing position.

At this time it is only necessary to adjust switch 452 back to its "grinding" position for the machine to be ready to commence a new cycle of working operation.

From the foregoing, it will be seen that this invention provides for a grinding machine having an indexible turret with at least two rotary chucks thereon, one of which is always in grinding position so that substantially none of the working time of the machine is lost.

The novel turret supporting arrangement of the present invention provides for accurate machining of the work pieces while the hydraulic and electric control systems provide for a substantially full automatic work cycle.

It will be understood that this invention is susceptible to modification in order to adapt it to different usages and conditions, and, accordingly, it is desired to comprehend such modifications within this invention as may fall within the scope of the appended claims.

I claim:

1. In a grinding machine; a bed, a turrent rotatably mounted in said bed, a pair of rotatable chucks mounted on said turret, means for indexing said turret for moving the chucks alternately into a working station, a single magnetic drive member in said bed in alignment with the turret in the said working station, a brake for each chuck, means for energizing said brakes during indexing of said turret, and means for deenergizing at least the brake of the chuck in the working station and for energizing said drive member following the indexing of the turret.

2. In a machine tool; a bed, a turret rotatably supported on said bed, a pair of rotatable chucks on said turret comprising drive shafts extending through the turret, armatures on the lower ends of said shafts, stationary brake members on the turret on one side of said armatures engageable therewith to halt said chucks, and a rotatable magnetic drive member in the bed in alignment with one of said shafts in the indexed positions of said turret, energizable for bringing about driving engagement between it and the said armature for driving the shaft.

3. In a combination; a rotatable chuck, a drive shaft therefor, an armature on the end of the shaft, a brake on one side of the armature and a rotatable drive member on the other side of the armature, resilient means urging the armature toward the drive member for driving engagement therewith upon energization of the drive member, and means for energizing the brake for moving the armature into braking engagement therewith.

4. In a grinding machine; a bed, a turret rotatably mounted on the bed, a reversible motor connected to the turret for indexing it to and fro between two operative positions thereof, first control means for energizing the motor for movement in one direction, second control means for energizing the motor in the opposite direction, a single manual switch for actuating said control means, and selector switches in circuit with said control means and operated by the turret in its indexed positions for discriminating between said control means.

5. In a grinding machine; a bed, a turret rotatable in the bed and having a pair of chucks located diametrically opposite thereon, said chucks being movable by the turret between working and loading stations, a splash shield between said stations, said splash shield including a movable section, and means for moving said section away from said turret prior to the indexing thereof.

6. In a grinding machine; a bed, a turret rotatable in the bed and having a pair of rotatable chucks located diametrically opposite thereon, said turret being adapted for oscillation to carry the chucks between oppositely disposed working and loading stations, a splash shield extending transversely of the turret between said stations, including a portion on the turret and another portion carried by the bed including a panel movable toward and away from the turret, means for moving said panel away from the turret at the end of a working cycle and prior to the indexing of the turret, means for retaining the panel in retracted position during indexing of the turret, and means for again moving the panel toward the turret before the beginning of another working cycle.

7. In a grinding machine; a bed, a turret rotatably mounted in the bed, a grinding wheel positioned over one side of the turret, a pair of rotatable chucks on the turret, means for indexing the turret for alternately positioning said chucks in the working station in operative alignment with said wheel, a splash shield between the working station and the loading station, means for supplying coolant to the wheel, means for retracting the shield and interrupting the coolant supply during indexing of the turret, and means for returning the shield and for again establishing the supply of coolant to the wheel after an indexing movement of the turret.

8. In a grinding machine; a bed, a turret rotatable in the bed and having a pair of chucks thereon, said turret being indexable between two diametrically opposite positions for positioning the chucks alternately in working and loading stations, a grinding wheel supported above the working station, a splash shield between the working and loading stations, means for supplying coolant to the working station, means for moving said wheel upwardly at the end of a working cycle, means responsive to the upward movement of the wheel for retracting said splash shield and for interrupting the coolant supply, and means operable after an indexing movement of the turret for again feeding said wheel downwardly and for returning the splash shield to its operative position and for resuming the supply of coolant to said working station.

9. In a grinding machine; a bed, a turret rotatable in the bed and having a pair of chucks thereon, said turret being indexable between two diametrically opposite positions for positioning the chucks alternately in working and loading stations, a grinding wheel supported above the said working station, a splash shield between the stations, means for supplying coolant to the working station, means responsive to the grinding wheel reaching a pre-determined lower position during a working cycle for automatically moving the wheel upwardly, means responsive to the wheel reaching a predetermined upper position for retracting said splash shield and for interrupting the coolant supply, means for indexing the turret while the wheel is up, and means responsive to the completion of an indexing movement of the turret for again feeding said wheel downwardly, the movement of said wheel downwardly from its uppermost position being operable to return the splash shield to its operative position and to again establish the supply of coolant to the working station.

10. In a grinding machine; a bed, a turret rotatable in the bed and having a pair of rotary chucks thereon, said turret being indexable between two opposite positions for positioning the chucks alternately in working and loading stations, brakes for said chucks, and a drive clutch for the one of the chucks in the working station, a splash shield between the stations, coolant supply means at the working station, means responsive to the wheel reaching a pre-determined lower position during a working cycle for automatically moving the wheel upwardly, contactor means operable in response to the wheel reaching its uppermost position for retracting said shield, for interrupting the coolant supply, for energizing said brakes and de-energizing said clutch, and for establishing an energizing circuit for the indexing of the turret, means for indexing the turret while the wheel is up, and means responsive to the completion of the indexing movement of the turret for again feeding said wheel downwardly, the downward movement of said wheel from its uppermost position being operable to make said contactor means ineffective.

11. In a grinding machine; a bed, a turret mounted in said bed, a pair of chucks rotatably mounted on said turret, means for indexing said turret for alternately positioning said chucks in working position, a single drive element for the chucks in the bed in line with the chuck in working position, a brake for each chuck, means for actuating said brakes to prevent rotation of the chucks during indexing of the turret, and means for interconnecting said drive element with one of the chucks aligned therewith after completion of the indexing of the turret and for releasing at least the brake for the said one of the chucks to permit driving of the chuck for a work operation.

JOHN C. WILSON.

References Cited in the file of this patent

UNITED STATES PATENTS

| Number | Name | Date |
|---|---|---|
| 732,801 | Turner | July 7, 1903 |
| 1,118,072 | Thompson | Nov. 24, 1914 |
| 1,270,770 | Barnes | July 2, 1918 |
| 1,361,883 | Littman | Dec. 14, 1920 |
| 1,575,968 | Bryant | Mar. 9, 1926 |
| 1,806,664 | Belden et al. | May 26, 1931 |
| 1,873,152 | Plantinga | Aug. 23, 1932 |
| 1,919,477 | Nash | July 25, 1933 |
| 1,989,517 | Holmes | Jan. 29, 1935 |
| 1,996,842 | Stevens | Apr. 9, 1935 |
| 2,131,151 | Smith | Sept. 27, 1938 |
| 2,145,310 | Lewis et al. | Jan. 31, 1939 |
| 2,224,265 | Johnson et al. | Dec. 10, 1940 |
| 2,259,870 | Ahnert | Oct. 21, 1941 |
| 2,352,180 | Bolsey | June 27, 1944 |
| 2,354,056 | Price | July 18, 1944 |
| 2,364,804 | Montgomery et al. | Dec. 12, 1944 |
| 2,448,921 | Silven | Sept. 7, 1948 |
| 2,576,201 | Wilson | Nov. 27, 1951 |
| 2,586,755 | Wilson | Feb. 19, 1952 |
| 2,622,375 | Haas et al. | Dec. 23, 1952 |